E. J. FRANCK.
KNITTING MACHINE.
APPLICATION FILED FEB. 16, 1912.

1,216,302.

Patented Feb. 20, 1917.
7 SHEETS—SHEET 1.

WITNESSES:
Rob R Kitchel
Frank O Finch

INVENTOR
Emil J. Franck
BY
Augustus B Stoughton
ATTORNEY.

E. J. FRANCK.
KNITTING MACHINE.
APPLICATION FILED FEB. 16, 1912.

1,216,302.

Patented Feb. 20, 1917.
7 SHEETS—SHEET 3.

E. J. FRANCK.
KNITTING MACHINE.
APPLICATION FILED FEB. 16, 1912.

1,216,302.

Patented Feb. 20, 1917.
7 SHEETS—SHEET 5.

WITNESSES:

INVENTOR
Emil J. Franck
BY Augustus B. Stoughton.
ATTORNEY.

E. J. FRANCK.
KNITTING MACHINE.
APPLICATION FILED FEB. 16, 1912.

1,216,302.

Patented Feb. 20, 1917.
7 SHEETS—SHEET 6.

WITNESSES:

INVENTOR
Emil J. Franck
BY
Augustus B. Stoughton
ATTORNEY

E. J. FRANCK.
KNITTING MACHINE.
APPLICATION FILED FEB. 16, 1912.

1,216,302.

Patented Feb. 20, 1917.
7 SHEETS—SHEET 7.

WITNESSES:

INVENTOR
Emil J. Franck
BY
Augustus B Stoughton
ATTORNEY.

UNITED STATES PATENT OFFICE.

EMIL J. FRANCK, OF PHILADELPHIA, PENNSYLVANIA.

KNITTING-MACHINE.

1,216,302.   Specification of Letters Patent.   Patented Feb. 20, 1917.

Application filed February 16, 1912. Serial No. 678,038.

*To all whom it may concern:*

Be it known that I, EMIL J. FRANCK, a citizen of the United States, residing at Philadelphia, in the county of Philadelphia and State of Pennsylvania, have invented certain new and useful Improvements in Knitting-Machines, of which the following is a specification.

Objects of the invention are to provide an automatic circular knitting machine for making full fashioned stockings, including the shaping of the calf and leg portions; to finish the portion which is shaped for the calf in an attractive way; to provide for space for the services which are required for operating or manipulating such a large number of needles as is required for doing fine work or making fine stockings; to provide for the easy removal and insertion of needles, and to provide a durable construction and combination of parts.

An embodiment of the invention chosen from other embodiments for the sake of explanation is illustrated in the accompanying drawings, in which—

Referring to the drawings there are two groups of needles, of which one group is circular and acting as a whole forms the ankle and foot, and acting in part forms or fashions the heel and toe of a stocking. The other group is arranged in a sector of the circle and operates along with the first mentioned group to shape the calf portion and make the leg or knee portion of the stocking. The needles 1, of one group and the needles 2 of the other group are inclined in respect to the axis of the needle head 3 and in respect to each other. As shown the inclination of the needles 2 is greater than the inclination of the needles 1. The result of this is that the needles 1 and 2 knit in substantially the same circle at the top of the head, but at their lower ends are at different distances from the axis of the lower part of the head. Among the advantages of inclining the needles of each group, mention may be made of the fact that ample room is provided at the base of the head for the accommodation of appropriate devices for working or manipulating the needles even though the number of the latter is comparatively great for the size of the circle where the knitting is done at the top of the head.

Figure 17:
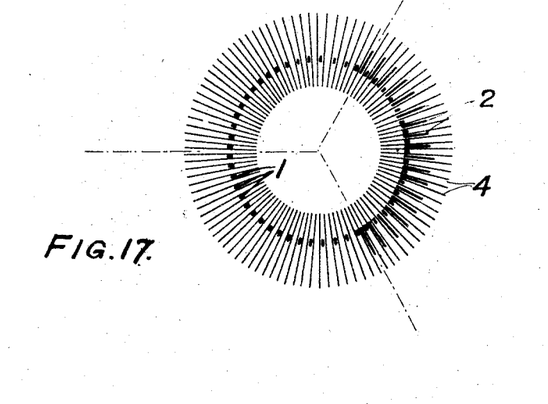
Fig. 17, is a top or plan view diagrammatically illustrating the arrangement of the needles and web holders.

Referring to Fig. 17, it will be observed that there are two web holders 4 between each of the needles 1, and the purpose of this is that there will be at least one web holder between every pair of needles when the needles 2 are brought into action.

5, is the cam ring which acts by way of the jacks 6 upon the needles 1. 7, is the cam ring that acts by way of the jacks 8 upon the needles 2. 9, is a cam ring that acts on the web holders 4. 11, is the thread carrier. In a general way these parts perform their ordinary functions which are well understood.

Figure 8:
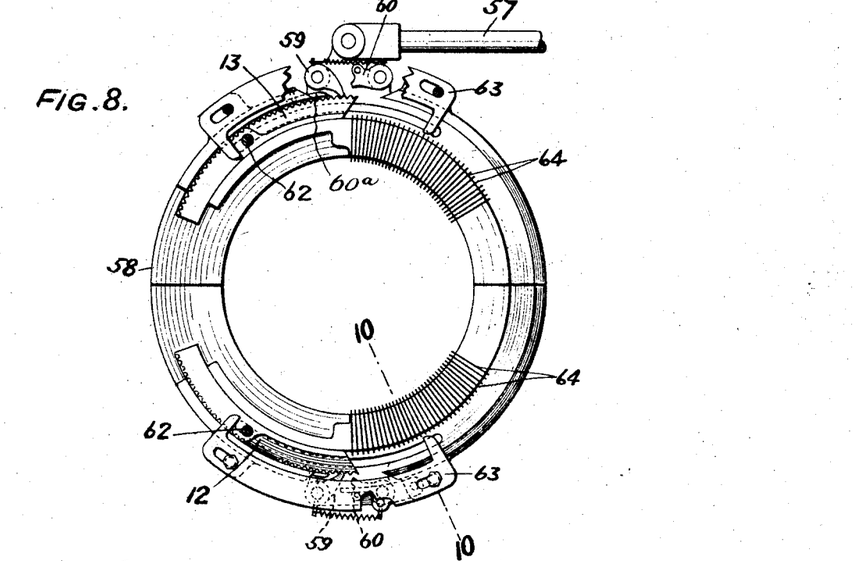
Fig. 8, is a top or plan view taken through the upper portion of the machine.
Figure 9:
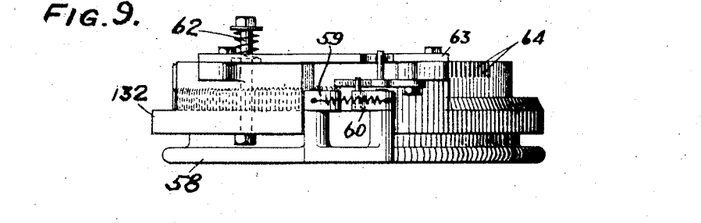
Fig. 9, is a side view of the part shown in Fig. 8.

12 and 13, Fig. 8, are needle strippers which throw certain of the needles 1, out of and into action in fashioning, for example, the heel and toe. 14, is a stripper ring which throws the requisite needles 1, out of action during the fashioning of the heel and toe.

In making a stocking it may be said that a few courses are knitted by all the needles of the group 1 by the rotation of the cam 5. Thereafter a part of these needles 1 are thrown out of action by the half ring stripper 14 and the fashioning for the toe is done by successively throwing other needles of the group of needles 1 into and out of action by the strippers 12 and 13. Meanwhile the cam ring 5 is reciprocated, or turned first in one direction and then the other for a part of the revolution. The foot is then made in the same way that the few courses were made and the heel is then made in much the same way as the toe was made. The ankle portion is then knitted like the foot portion and the calf portion is made by widening the tube by the introduction of the needles 2 through the instrumentality of the drum 70 and its accessories, and thereafter the leg and knee portions are made by all the needles 1 and 2, whereupon the needles 2, are thrown out of action, and the described operations are repeated.

Figure 5:
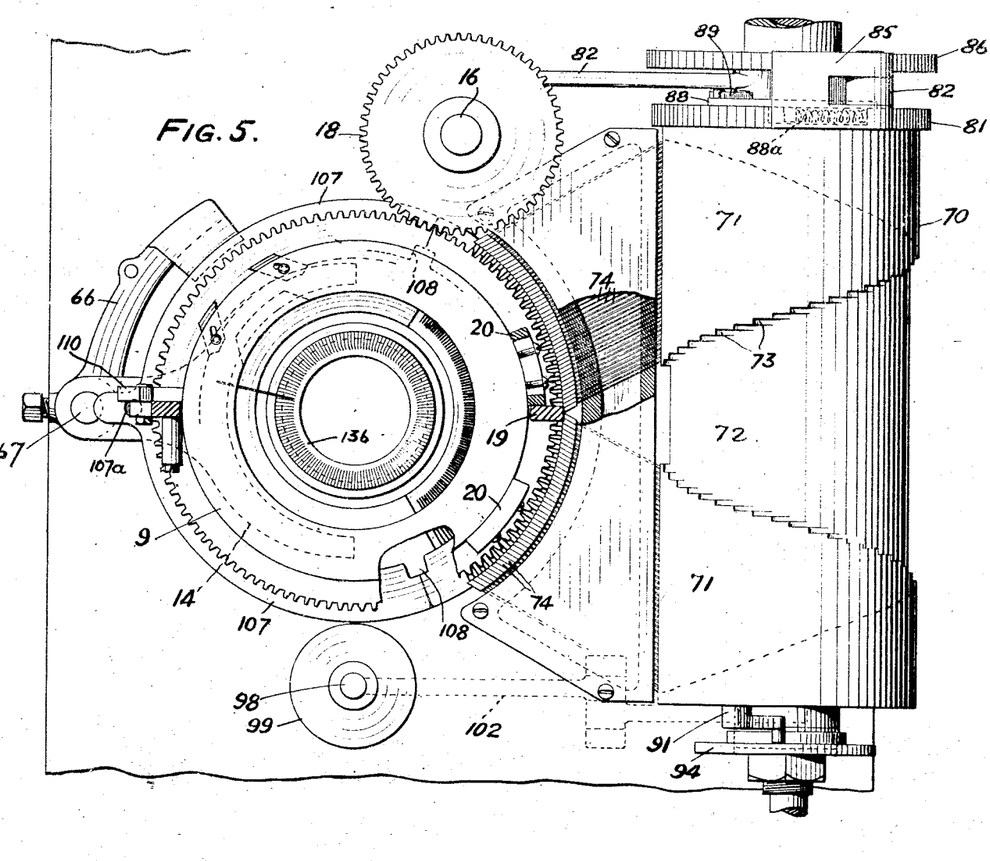
Fig. 5, is a top or plan view with parts broken away and parts omitted in order to illustrate the invention.

15, is the main shaft and it is geared to the upright shaft 16 by bevel gearing 17. The shaft 16 drives the cam ring 7 by the pinion 18, and the cam ring 7 drives the web holder cam 9 by means of the post 19, which carries the thread guide 11, Fig. 6. There are adjustable stops 20, Fig. 5, one on each side of the post 19, so that there is some lost motion between the post and the cam ring 9, which is useful in making heels and toes. The shaft 16, also drives the cam ring 5 of the needles 1 by way of gears 21. The shaft 15, is rotated in one direction and at relatively high speed by the pulley 22, Fig. 3, (connected by a sleeve to the gear wheel 23, which is also a part of a clutch), when the clutch member 24, splined to the shaft is in engagement with the clutch member 23. The shaft 15 is oscillated, or turned first in one direction and then in the other direction, for heel and toe work or fashioning, and this is done at comparatively low speed; but prior to this the pulley 25 connected by a sleeve to the gear 26, meshing with gear 27, on a counter-shaft having gear wheel 28 meshing with wheel 23, turns the shaft 15 at comparatively low speed but in one direction and this is done in order to avoid a sudden change of direction of revolution at high speed. During this operation the gear wheel 23 drives the pulley 22, but the belt is not on it but is on pulley 25. 29, is a gear wheel driven from the wheel 23 and it oscillates the quadrant 30 by way of the link 31. The quadrant drives the gear wheel 32, loose for rotation, but not end movement, (by reason of part 302, Fig. 3) on the shaft 15, and when the clutch member 24, engages the wheel 32, the shaft 15, is turned first in one direction and then in the other, as are also the cams 9, 7, and 5, by the mechanism described.

Figure 1:
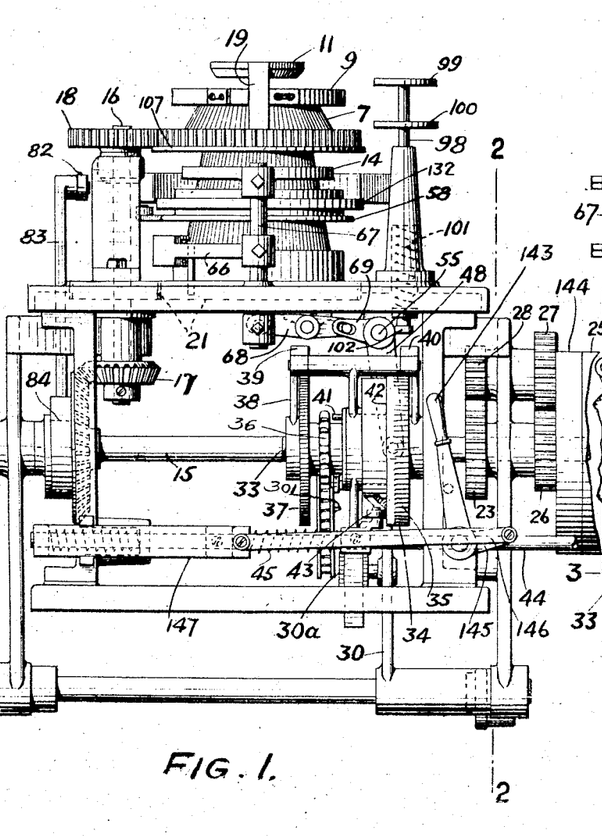
Figure 1, is a front view of the machine with certain of the parts omitted in order to avoid confusion.
Figure 2:
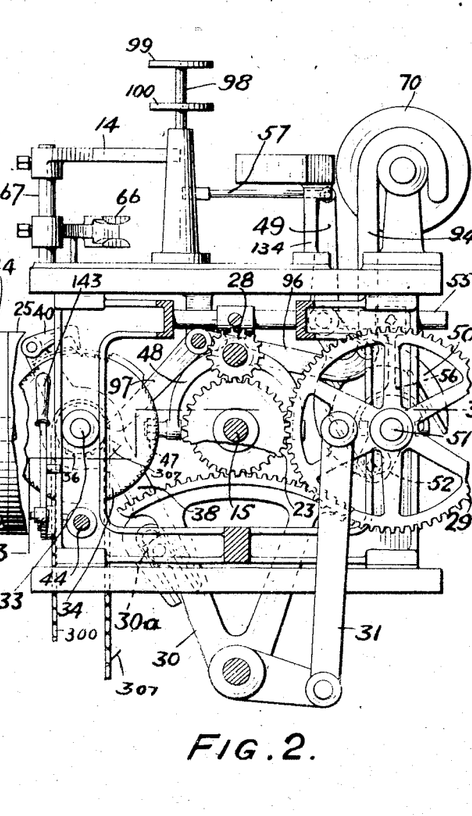
Fig. 2, is a sectional view taken on the line 2—2 of Fig. 1 and showing some of the parts omitted from Fig. 1, and omitting some of the parts shown in Fig. 1.
Figures 3, 4, 22:
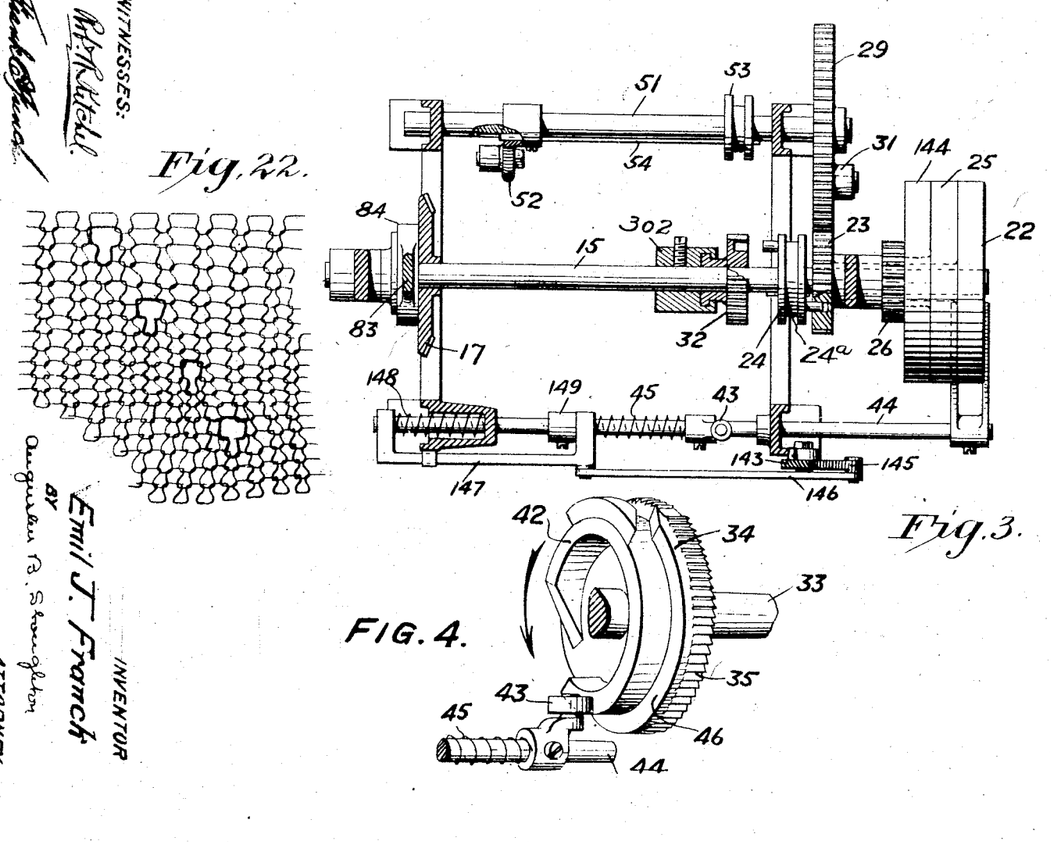
Fig. 3, is a sectional plan view taken on the line 3—3 of Fig. 2, with parts omitted.
Fig. 4, is an enlarged view showing in perspective a cam illustrated in Figs. 1 and 2.
Fig. 22, is an enlarged view of the fabric produced by the machine showing the loop structure at the point of introduction of the additional needles.
Figure 10:
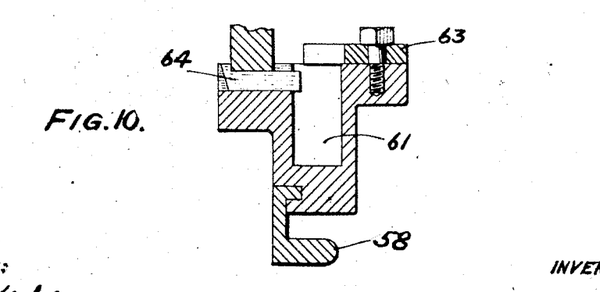
Fig. 10, is a section on the line 10—10 of Fig. 8.
Figure 11:
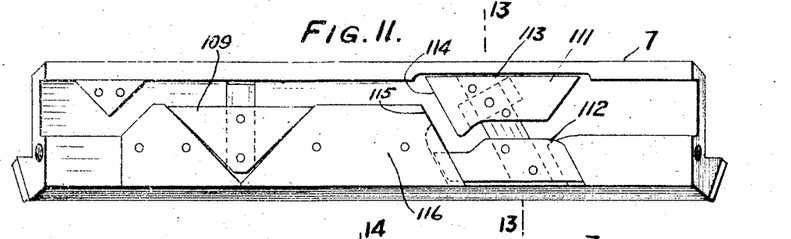
Fig. 11, is a development of one part or half of the top needles cam.
Figures 12, 13, 14:
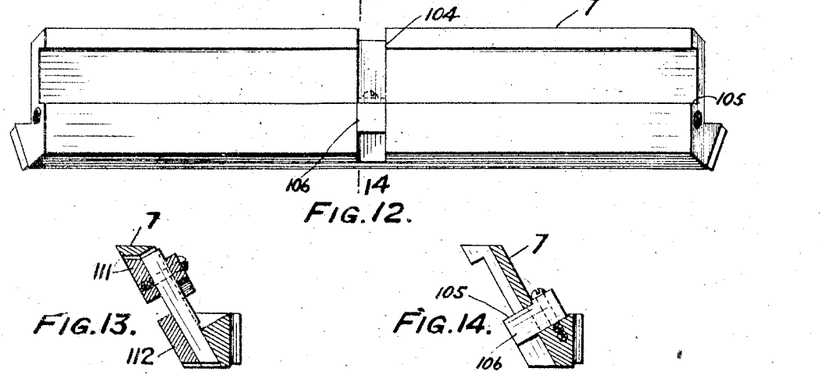
Fig. 12, is a development of the other part of the top needle cam shown in Fig. 11.
Figs. 13 and 14, are sectional views on the lines 13—13 and 14—14 of Figs. 11 and 12.
Figure 15:
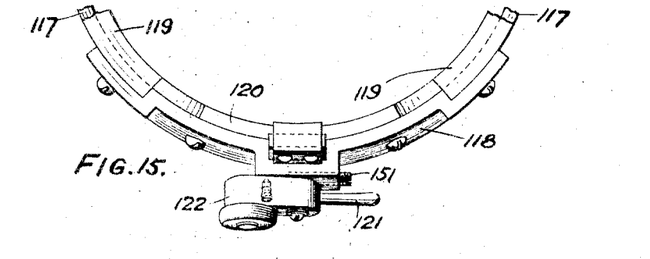
Fig. 15, is a top or plan view of a part of the other cam ring which is near the base of the machine.

There is a short stud 33 at the front of the machine, Fig. 1, and on this stud is mounted a cam 34 which is provided with teeth 35 and is capable of rotation. On this stud there is also a sprocket wheel 36 having a ratchet wheel 37. 38, is a pivotal pawl arm mounted on the stud 33 and provided with pawls 39 and 40, and oscillated from the quadrant 30 by means of a pin-and-fork connection 30ᵃ. The pawl 39 drives the sprocket wheel 36 continuously, and the pawl 40 drives the cam 34, one revolution and then falls into a space formed by the omission of one of the teeth 35, so that the cam comes to rest. There is a pattern chain, 300, of which a part is shown in Fig. 1, that runs on the sprocket wheel 36 and is provided with lugs 301, which hit the projection 41, on the cam 34, so as to start up the cam at predetermined intervals. The cam 34 controls the mechanism for making the heel and toe. During one revolution of the cam 34, the toe is made and then the pattern chain determines when the cam shall make another revolution, during which the heel is made. The cam is provided with an end cam face and with a surface cam groove. The end cam face 42 operates on a roller 43 fastened to the belt shifter 44, and held up to the cam by a spring 45. The cam groove 46 operates a roller 47 on the shipper fork 48, Fig. 2, which operates the clutch member 24 because its arms are arranged in the groove 24ᵃ, of the clutch member 24. When the roller 43 is on the low part of its cam, the roller 47 is in the offset part of its cam shown at the top of Fig. 4, so that the machine is running at high speed and the needle and web-holder cams are going around, and when the rollers are on the other parts of their cams the machine is running at low speed and the cams are oscillating. Having regard to the operation of the strippers 12 and 13, 49, Fig. 2, is a rocker arm, the lower end of which is provided with a fork 50. 51, Fig. 3, is a shaft rotated by the gear wheel 29 and provided with a tappet arm 52 equipped with a suitable roller. This tappet arm 52, when it is in the fork 50 rocks the arm 49 and the tappet arm may be withdrawn from the fork so as to permit the latter to remain at rest. The tappet arm is endwise movable on the shaft 51 and is connected with the grooved collar 53 as by a long key rod 54. There is a cross-shaft 55, Fig. 2, which is attached to the fork 48 and which is rocked when the fork is rocked, and this shaft 55 is provided with a fork 56, Fig. 2, which engages the collar 53 so that when the cam 34 brings about the proper changes for producing oscillation of the knitting and web-holder cams, it also operates to position the arm 52, in the fork 50, and thus set the rocker arm 49 in motion. The rocker arm 49 is connected by a link 57 with a ring 58 that can turn back and forth on the needle head. The ring 58, Fig. 8, carries the pawls 59 and 60 arranged in pairs diametrically opposite each other. The pawls 59 are always in engagement with and operate upon racks formed on the strippers 12 and 13. The pawls 60 are not always in action. The pawls 59 drive the strippers toward the right in Fig. 8 and the strippers move in the spaces 61 and are retarded by friction rods 62. These consist of bolts having washers and springs strung on them. The spring pulls the bolt upward and causes the head to bear frictionally on the under side of the casting. 63, are cam plates movable in respect to the needle head and the working faces of these plates serve to operate on pins on the pawls 60 and to keep these pawls out of action and to let them come into action. As the strippers travel toward the right, the cam plates 63 hold the pawls 60 out of action, as shown in Fig. 8. At or near the end of the travel of the strippers, the parts 62 strike the cam plates 63 and shift them into such position that the pawls 60 are free to work. The advantage of the cam plates is that the working or non-working of the pawls 60 is positively controlled. The pawls 59 drive one tooth at a time, whereas the pawls 60 drive two teeth at a time. The part 58, has a stroke sufficient for causing the pawls 59 and 60, to take two teeth but there is a stop 60ª, on the casting which holds the pawl 59, in such manner that it can only get one tooth. The result of this is that the strippers 12 and 13 are moved toward the left in Fig. 8, one tooth at a time in excess of the motion to the right given by pawl 60, so that there is a resultant motion of one tooth to the left until their projections 62 shift the cam plate 63 toward the left again throwing the pawls 60 out of action. 64, Fig. 10 are jacks arranged in grooves in a ring 132, Fig. 6, applied to the needle head and they are operated upon by the strippers and in turn operate on the bends 65 of the needles 1 so as to release them from the jacks 6 which are operated upon by the cam 5. The jacks 64, do not interfere with the bed for the needles 2, because they do not come out from the center far enough to strike that bed. The half ring 14 and also the tappet arm 66 for the cam 5 are carried by a vertically movable rod 67. This rod 67 is raised and lowered by the intermediate pivotal lever 68, Fig. 1, acted upon by a crank 69 attached to the shaft 55.

Figures 6, 7:
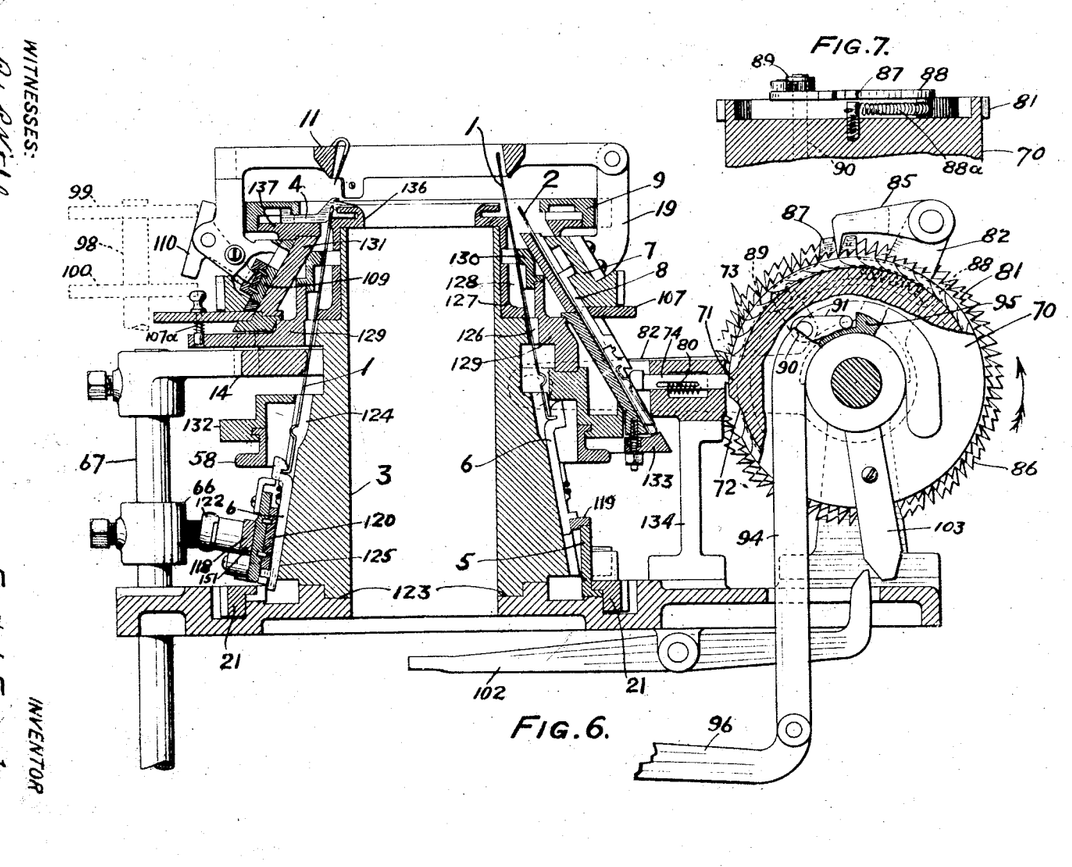
Fig. 6, generally speaking, is a sectional view taken through the center of Fig. 5.
Fig. 7, is a top or plan view of the part shown at the right hand side of Fig. 6.

Evidently the described mechanism fashions heels and toes and makes the round parts of relatively small diameter. 70, is a drum of two diameters meeting along diverging spiral lines crooked step by step and this drum has along one element or axial line a high part 71 and along another adjacent element a groove 72, Fig. 6. Along the spiral lines and at the steps thereof are circular concave slopes 73. This drum can be made of one piece and the circular concavities can be made by a milling cutter. The high parts of the drum serve to push the jacks 74 toward the axis of the needle head so as to disconnect the needles 2 from the jacks 8 and the low parts of the drum serve to permit the jacks 8 to engage the bits of the needles 2. The jacks 74 have long tails 76 and short tails 77. When the long tail 76 is on a high part of the drum the bits of the needles 2 are held clear of both of the notches 78 and 79, so that the needle is entirely disconnected from the jack, as has been mentioned, but when the short tail 77 is on a high part of the drum the needle bit is clear of the notch 79 but not of the notch 78 in which it may work. The object of this is to accomplish three things, first, to throw the needles out of action, second, to have the needles make full strokes, and third, to have the needles make partial strokes. When one of the needles 2 comes into action it rises and receives a thread under its hook, but in descending it makes a short stroke; it then rises again and the next time in descending it makes a full stroke. The result of this is two-fold; first, such holes as are ordinarily made in the work when a needle is added are avoided, and second, even though a needle be bent somewhat or otherwise out of line, it will get the second loop all right. Inasmuch as the widening needle 2, when introduced, does not make a full down stroke, it follows that it does not draw down a loop of thread which if drawn down would remain a loop and cause an opening in the fabric. Furthermore since this widening needle 2 makes a short descent at first, the needles 1, when they make a full stroke down, draw the thread well onto the needle 2.

When the drum 70 is in the position shown in Fig. 6, the axial high part 71 holds all the jacks in position for throwing all of the widening needles 2 out of action, so that the machine would make tubular work of small diameter. Intermediate of these positions the drum rotates intermittently and the concavities 73, coöperating with the long and short tails 76 and 77, of the jacks 74 let two jacks, one on each side of the center, move under the influence of their springs 80 out from the axis of the needle head, thus bringing a needle on each side into action, causing it to make one short stroke downward and to thereafter make full strokes. The described operation takes place all the way across the needles following the line of the spirals. The drum is provided with a ratchet wheel 81 fast to it. The pawl arm 82 is rocked continuously by an eccentric rod 83 from an eccentric 84 on the shaft 15, Fig. 6, and left-hand side of Fig. 4. The pawl arm 82 is provided with a pawl 85 which is made comparatively wide for a purpose to be presently described. 86 is a ratchet wheel in range with the pawl 85 and mounted loose from the drum. It is provided with high and low teeth. When the pawl 85 is in a low tooth it reaches the ratchet wheel 81 and drives it, but when the pawl is in a high tooth it simply drives the loose ratchet wheel until the pawl again comes into a low tooth. The purpose is to provide for driving the drum at a moderately slow speed in order not to introduce the needles too fast. As has been said the drum is arrested when in the position shown in Fig. 6 and in one other position which has been referred to. For this purpose it is provided with a guard 87 which serves to put the pawl 85 into and out of action, thus starting and stopping the drum. The guard 87 consists of two teeth, higher than the teeth on either ratchet wheel, but with space between them as deep as the teeth in the ratchet wheel 81 when the guard is in its lowest position. The guard 87 is angularly movable in respect to the drum, although it rotates with the drum. For this purpose its teeth are fastened to a plate 88 movable in a slot concentric with the drum and connected with the drum by a spring 88ᵃ which, in connection with a stop, establishes the normal position of the guard. The plate 88 is also connected with a crank 89 on one end of a shaft 90 extending clear through the drum and having at its other end a crank 91 so that when the crank 91 is turned, it turns the shaft 90, the crank 89, and shifts the guard angularly in respect to the drum. When the guard is in the position shown in Fig. 6, it is evident that the pawl merely works on its right hand tooth sliding on top of the same and then down again; thus the drum is at rest, it being understood that the friction of the drum is sufficient to hold it still while the pawl makes the described movements. When the left hand tooth is in the position that the right hand tooth occupies in Fig. 6, the operation is the same and the drum remains at rest. To get the guard 87 clear of the tooth use is made of a lever 94. When this lever 94 is elevated its lateral projection 95 turns the crank 91 and thus shifts the guard 87 angularly of the drum and out of range of the pawl. As shown in Fig. 6, the crank 91, is at rest on the lateral projection of the lever, and if the drum had been moving, the crank 91 as it turned with the drum would ride onto the lateral projection 95 when the lever 94 was raised. The lateral part of the lever is made somewhat cam shaped so as to make the parts work rapidly, i. e. the lever 94, drops comparatively slowly but the part 91, may drop quickly off the cam. The lever 94 is connected to one end of a centrally pivoted lever 96, the other end 97 of which is so positioned that lugs 307 projecting from the pattern chain, on the sprocket wheel 36, may strike and operate it and the position of the lugs on the pattern chain therefore time the starting and stopping of the drum.

98 is a vertically movable rod provided with two disks 99 and 100 and with a spring 101 for pulling it down. 102 is a lever for pushing the rod 98 up. The radial arm 103 attached to the drum raises and lowers the disks 99 and 100, once during each revolution of the drum.

The cam ring 7, since it is made in two parts can be taken off and applied without disturbing the web holders 10. For this purpose the two parts are disconnected and taken off or applied laterally from opposite sides. Furthermore it is provided with an upright slot 104 and its working surface 105 is continued across the slot by means of a removable plug 106. When the plug 106 is withdrawn radially from the cam, it is evident that a jack, for example, a broken jack can be taken out of the cam and this is also true of the needles. The ring 107 is provided with notches 108 which can be brought into line with the notch or groove 104 when needles or jacks are to be removed. The ring 107 can be rotated around the head and is normally held by a spring pin 107ᵃ in such position that its notch will be away from the widening needles 2. The movable section 109 of the cam 7 is connected with a lever 110 which, as the cam rotates, strikes either the disk 99 or 100, so that it is turned in position for permitting the jacks to pass over it or under it, and in the latter case all the loops are thrown off the needles 2 prior to their going out of action. The stitch cams 111 and 112 are attached to a block adjustable in a groove 113, which is parallel with the face 114 of the cam 111 and with the face 115 of the cam section 116, so that when the movable sections are adjusted the space for the passage of the needles remains the same. The cam ring 5 consists of a cylindrical section 117 and of an inclined section 118, where the stitch cams are arranged. The cylindrical portion is covered by a plate 119 on top of which the jacks 6 ride. This construction is comparatively easy to make and it permits the needle head 3 to be lifted out of the cam. The stitch cam 120 is not particularly new and is adjusted by the lever 121, manually whenever it is necessary, and is moved slightly up and down automatically by the lever 122 which strikes the tappet lever 66 at the appropriate time, the position of the tappet lever 66 being determined as has been described. This is done to make longer loops at the heels and toes which are usually of heavier thread or according to the thread.

The needle head 3 is conical on the outside and is seated at 123 in the top plate of the machine. At the base of the head are grooves which are deeper at the upper parts 124 than at their lower parts 125. The jacks 6, and the butt-parts of the needles 1 work in these grooves. The shallow parts 125 insure engagement of jacks and needles at the end-part of the down stroke where the strain is the greatest, because at that part of the stroke they cannot become unhooked. Moreover the needles are straight since the deeper part of the grooves affords space for them to spring into and this evidently is an advantage not only from a manufacturing point of view, but also in the matter of setting the needles in and out. 126 are webs on the needle head between which the needles 1 work. 127, is a ring seated on the needle head and having its lower rim arranged for the needles to slide on it. This ring has webs 128 with grooves between the webs, and the grooves are rounded at the bottom. These grooves come opposite the needles, and the webs and the rounded bottoms of the grooves facilitate the insertion of needles. 129, is a ring shrunk on the webs 126 and extending upward and downward. 130, is a ring attached to the upper part of the ring 129 and it serves as a needle guide. 131, is a grooved bed for the needles 2 and it is carried by the ring 129. As shown the part 131 comprises a hardened upper part where the cams are and a lower part.

Figure 16:
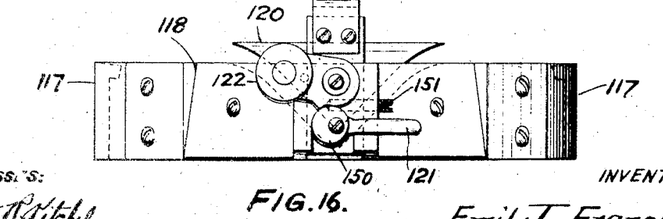
Fig. 16, is an elevational view of the same.
Figures 18, 19, 20, 21:
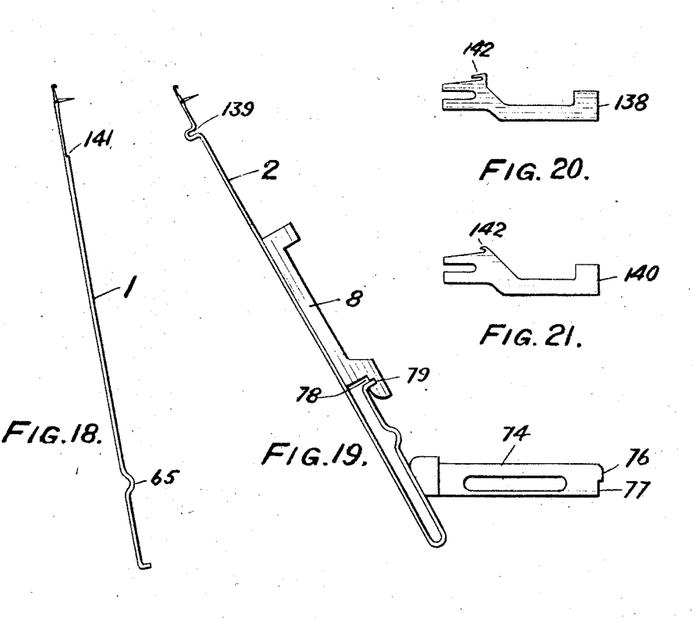
Fig. 18, is a view of one of the needles of one group.
Fig. 19, is a view of one of the needles of another group, with certain of its accessories detached from the machine.
Figs. 20 and 21, are views of the web holders.

132 is a two-part ring carried by and depending from the lower part of the ring 129. It serves to carry the movable ring 58 to which reference has been made. 133, is a two-part ring adjustably attached to the lower rim of the bed 131 and it serves to limit the downward stroke of the needles 2. By adjusting this ring the stroke of the needles can be made longer or shorter. 134 is a standard fitted at its top with a ribbed bed and in the grooves between the ribs the jacks 74 are arranged. 136 is a ring mounted on the needle head and provided with a lip that takes into a notch on the ends of the web holders, so as to guide them and keep them from rising. 137 is a ribbed ring between the ribs of which the web holders work. 138, Fig. 20, is a web holder adapted for use in connection with the needle 2, shown in Fig. 19, which needle has an off-set 139. The purpose of the off-set 139 is to increase the size of the lateral bearing between the needle and web holder so that the top part of the web holder when it is moving out from the axis of the needle head cannot get in behind the needle and pull it out and it might get in behind the needle by reason of bending or by the fact that the tension on the yarn might bend the needle over sidewise. The web holder 140, shown in Fig. 21, can be used with a needle like that shown in Fig. 19, but without the off-set 139 and with a straight stem, because the top of this web holder, by reason of the inclination thereof, cannot get behind the needle since the bearing between the needles 2 is of sufficient size for preventing this. 141, Fig. 18, is a notch near the top of the needle 1. The notch serves in widening and narrowing, when the needle is out of action, to hold the work sufficiently high to prevent the throat 142 of the web holders from catching the loop that is held by the notch and for permitting the throat to pass under that loop and catch the next or in other words to catch a loop of the needles that are knitting. 143 is a hand lever by means of which the belt shifter 44 can be moved to put the belt onto the loose pulley 144, at any time. It also serves to start the machine. This handle 143 is provided with a crank arm 145 connected by a link 146 to a slide 147 which is normally shifted toward the left in Fig. 3 by a spring 148. The slide 147 is the back stop for the spring 45 and coöperates with the collar 149 on the belt shifter. Evidently the last described mechanism can be used to shift the belt shifter 44 at any time toward the left regardless of the position it may have occupied under the influence of the cam 34. The cam 34 can evidently move the belt shifter 44 toward the left, free of the hand operated mechanism. Referring to Fig. 16, the stud 150 that carries the arm 121 is connected with the cam section 120. The needles tend to lift this section and the part 122 operating on the part 150 tends to depress this section. The part 150 is of eccentric shape so as to afford an adjustment and the screw 151 overlies the stud 150 and limits the upward motion of the cam section 120. The purpose is to adjust the length of the stitches.

The concave slopes 73, and the jacks 74, operate upon the needles 2, not to secure a tucking operation upon the needles 2, first entering into the work, but the operation is as follows: When a needle 2, first rises the thread goes around it, it then descends making a short stroke so that the thread goes into its hook, but the stroke is so short that a loop is not drawn. There is just the thread under the hook. The needle rises again; gets the thread and makes a full stroke and draws a full loop, throwing off the thread first received and not drawn into a full loop, and thus the needle enters the work and makes full strokes drawing loops until the needle is thrown out.

What I claim is:

1. A circular knitting machine having in combination a circular needle head and a needle bed of the form of a part of a circle, each equipped with a set of needles all of which are inclined in the same direction and those of one set being disposed at an acute angle in respect to those of the other set, and means for operating all the needles through loop forming strokes of the same length whereby each needle pulls its own loop only and chafing of yarn is avoided and an even fabric is made with the result that high speed of operation is attained.

2. In a knitting machine the combination of a needle head tapering outwardly toward its base, a needle bed inclined outwardly from the needle head toward the base thereof and extending part way around the head, needles arranged around the needle head and in the needle bed with their hooks turned in the same direction, and means at the base of the head and at the base of the bed for operating all said needles through loop forming strokes of the same length whereby each needle pulls its own loop only and chafing of yarn is avoided and an even fabric is made with the result that high speed of operation is attained.

3. In a circular knitting machine the combination of a circular group of needles inclined to separate their butts, a second group of needles arranged in a part circle and inclined to separate their butts and disposed at an acute angle with the first-mentioned needles, and means accommodated by the space due to the separation of the needles and adapted to operate all the needles through loop forming strokes of the same length whereby each needle pulls its own loop only and chafing of yarn is avoided and an even fabric is made with the result that high speed of operation is attained.

4. In a circular knitting machine the combination of two sets of latch needles arranged at an acute angle in respect to each other and whereof one extends part way around the machine, means including web-holders for knitting a seamless tubular plain web of varying diameter on said needles, and means for causing some of said needles to first make short loop pulling strokes in respect to the web-holders and thereafter full loop pulling strokes, in respect to the web-holders and for throwing each of these loops off separately substantially as described.

5. In a circular knitting machine having a circular group of latch needles and having extra latch needles inclined in respect to each other and means for knitting a seamless tubular plain web upon said needles, the combination of means for throwing the extra needles into action and causing them to first make short loop pulling strokes and then make full loop pulling strokes and for throwing the long and short loops off separately.

6. In a machine of the type described the combination of an extra needle having a spring bit, a needle jack having two notches one deeper than the other, a presser jack for the spring bit provided with a long and a short tail, and a drum having projections which operate on the long and short tails, substantially as described.

7. In a machine of the type described the combination of the needle head tapering outwardly toward its base of a needle cam ring arranged at the base of the head and having the part thereof where the cam is located inclined and the rest thereof cylindrical and provided with a top plate, substantially as described.

8. In a machine of the type described the combination of a straight needle provided near its top with a notch and web-holders arranged to pass under a loop held by the notch, substantially as described.

9. In a machine of the type described the combination of a web-holder, means for moving it, a needle, and means for moving it, and said needle provided with a bend 139 facing the center of the machine and in contact with the web-holder in the upper position of the needle to keep the outside edge of the web-holder from catching the inner edge of the needle.

10. The combination in a machine of the type described of extra needles, presser jacks for the extra needles, and a drum operating on the jacks and of two diameters meeting along diverging spiral crooked step by step lines made up of concave slopes, substantially as described.

11. In a machine of the type described the combination of extra needles, the bed for those needles, jacks for actuating said needles, means for coupling and uncoupling the jacks and needles, and an adjustable stop ring at the bottom of said bed, substantially as described.

12. In a knitting machine the combination of ring 107 having notch 108 for taking out needles, jacks retained by said ring which serve as a stop for the jacks, and a cam ring 7 mounted on the first mentioned ring.

13. In a machine of the type described the combination of jacks having ends 76 and 77 of relatively different lengths, and a drum having notches with curved bottoms for giving the jacks two positions.

In testimony whereof I have hereunto signed my name.

EMIL J. FRANCK.

Witnesses:
CLIFFORD K. CASSEL,
FRANK E. FRENCH.